United States Patent [19]

Stengle et al.

[11] 3,935,346

[45] Jan. 27, 1976

[54] COATED PLASTIC SUBSTRATES FOR COATING COMPOSITIONS

[75] Inventors: Edward J. Stengle; James J. Tillman, both of Toledo, Ohio

[73] Assignee: Owens-Illinois, Inc., Toledo, Ohio

[22] Filed: July 1, 1974

[21] Appl. No.: 484,556

Related U.S. Application Data

[62] Division of Ser. No. 340,071, March 12, 1973, Pat. No. 3,868,343.

[52] U.S. Cl. ............................. 427/385; 427/372
[51] Int. Cl.² ..................... B05D 7/02; C08J 7/04
[58] Field of Search ......... 117/138.8 A, 138.8 UA, 117/161 ZA, 138.8 F; 260/29.4 R, 826, 29.2 M

[56] References Cited
UNITED STATES PATENTS

| | | | |
|---|---|---|---|
| 2,498,485 | 2/1950 | Clawson | 117/5.5 |
| 2,500,842 | 3/1950 | Mackenzie | 260/45.2 |
| 2,937,155 | 5/1960 | Eastes et al. | 260/29.4 |
| 2,949,434 | 8/1960 | Bailey et al. | 260/45.2 |
| 3,032,442 | 5/1962 | Roth | 117/139.4 |
| 3,425,974 | 2/1969 | Semroc | 260/21 |
| 3,432,312 | 3/1969 | Feagin et al. | 106/38.3 |
| 3,433,764 | 3/1969 | Walmsley | 260/826 |
| 3,457,221 | 7/1969 | Stengle | 260/37 SB |
| 3,471,388 | 10/1969 | Koral | 260/856 |

*Primary Examiner*—P. E. Willis, Jr.
*Attorney, Agent, or Firm*—Robert F. Rywalski; Edward J. Holler

[57] ABSTRACT

There is provided a coating process, and compositions for practicing the process, wherein organic polymeric substrates, and especially polycarbonates and acrylics, are coated with a coating composition which is curable in a short period of time to provide the substrate with a hard, abrasion-resistant, mar-resistant, chemical resistant and acetone-resistant, strongly adhered coating. The coating composition employs the use of effective cure promoting amounts of a methanol and lower alkyl alcohol-melamine-formaldehyde partial condensate reaction products which are added to organopolysiloxanes made from methyltrialkoxysilane, wherein the organopolysiloxanes are made by a prescribed technique; the alkoxy groups contain one to six carbon atoms and the alkyl alcohol is a $C_2$ to $C_4$ alkyl alcohol or mixtures thereof. Most desirably, the organopolysiloxane is made from methyltriethoxysilane and the alkyl alcohol-melamine-formaldehyde partial condensate reaction product is an isobutylated and methylated melamine-formaldehyde. Clear, solid polycarbonate substrates are especially advantageously coated as provided herein to provide a coating with the above features and one which has good optical clarity.

17 Claims, No Drawings

COATED PLASTIC SUBSTRATES FOR COATING COMPOSITIONS

This is a division of application Ser. No. 340,071, filed Mar. 12, 1973, now U.S. Pat. No. 3,868,343.

THE INVENTION

This invention generally relates to coating compositions, and coating methods, for coating solid polymeric substrates for example, polycarbonates, acrylics, and polysulfones; more particularly, it relates to organopolysiloxane coating compositions having incorporated therein a methylated and $C_2 - C_4$ alkylated melamine-formaldehyde partial condensate resin in an amount sufficient to increase the rate by which the organopolysiloxane can be cured to a thermoset condition to provide a hard, strongly adhered, abrasion-resistant, mar-resistant, chemical resistant, and acetone-resistant coating on the polymeric substrate.

The present invention has as its object the provision of coating compositions, and methods for using these compositions for coating organic polymeric substrates, wherein the coating composition is possessed of a totality of desirable coating features. The coating compositions are capable of forming hard, strongly adhered, abrasion-resistant, mar-resistant, chemical resistant, and acetone-resistant coatings on solid, polymeric substrates, thereby making the substrates capable of utilization in wide areas of technology, including protective coatings, decorative coatings, and, especially, for example, with regard to polycarbonates, coatings for lenses and the like. The coating compositions have prolonged shelf-life stability, making it possible for them to exist without gellation for periods of 6 to 8 weeks and even longer; thus, in contrast to other coating compositions, for example coating compositions using gamma-aminopropyltriethoxysilane for purposes of catalyzing the curing rate and which have short shelf lives, the present compositions, with their long shelf-life stability, represent marked improvements. Additionally, the compositions of this invention can be cured to coatings having the above-described beneficial properties at an enhanced rate, thus increasing the efficiency of the overall coating process and, likewise, minimizing the consumption of natural resources required to provide the heat energy for curing.

The benefits of the present invention are attained by adding to prescribed types of hydrolyzed and partially condensed, further condensable, thermosettable organopolysiloxanes effective cure promoting quantities of an alkyl alcohol-melamine-formaldehyde reaction product, wherein the alkyl alcohol is methanol and a $C_2$ to $C_4$ alcohol to form a coating composition. The composition is then applied onto solid polymeric substrates, that is, non-porous substrates, and then cured to produce the desired coating.

The organopolysiloxanes employed are not new per se and are made from prescribed materials in a prescribed manner. The organopolysiloxanes are hydrolysis and partial condensation products of water and methyltrialkoxysilane, wherein the alkoxy group contains one to six carbon atoms. A highly preferred precursor is methyltriethoxysilane. Generally, as will be indicated in more detail hereinafter, these organopolysiloxanes are manufactured under controlled conditions, by a process which comprises a heating and concentrating step to produce a solution of a hydrolyzed and partially condensed organopolysiloxane or by a process which comprises a heating, concentrating, and precuring step to produce a solvent-soluble, further-curable organopolysiloxane. The latter process may include a solidification of the solvent-soluble, further-curable organopolysiloxane to produce materials which are solid, thereby allowing for their convenient storage and transportation. A particularly preferred organopolysiloxane contemplated for use herein as a coating composition is prepared by a process consisting essentially of the heating step and a concentrating step, i.e., the material employed in the coating composition is the hydrolysis and partially condensed product as it exists prior to the precuring step.

In the coating aspect of this invention, all that is required is that an organic solvent solution of the coating composition be applied onto the solid, polymeric substrate, the solvent then evaporated, and the residual coating composition of the organopolysiloxane and the added (methanol and alkyl alcohol) melamine-formaldehyde partial condensate resin then be heated at a time and for a temperature sufficient to convert it to its thermoset condition and thereby form a hard, strongly adhered, abrasionresistant, mar-resistant, chemical resistant and acetone-resistant coating on the substrate. Inasmuch as the particular organopolysiloxanes contemplated herein are reacted in an environment where at least some by-product alkanol is retained and acts as a solvent, suitable solvents are the lower alkyl alcohols, for example, the $C_1$ to $C_5$ alcohols like butanol, ethanol and methanol. Those skilled in the art will routinely select other appropriate organic solvents, exemplary of which may be cited acetone, ethyl acetate, dioxane, ethyleneglycolmonomethylether, ethyleneglycolmonoethylether, and the like. The concentration of the coating composition will be routinely selected by those skilled in the art to obtain the desired results. In general, however, excellent results will be obtained by using concentrations of the organopolysiloxanes on the order of 15 to 20 percent by weight of total organopolysiloxane solids in the organic solvent solution to about 50 or 55 percent, preferably about 25 to about 35 percent and, most desirably, about 30 percent. Preferred coating thicknesses are on the order of about 0.35 mils to about 0.75 mils.

Exemplary of the organic polymeric substrates which may be coated to obtain quite outstanding products are the solid polycarbonates including both the polyalkyl carbonates and polyaryl carbonates, the solid polysulfones and the solid acrylics. Other exemplary plastics include solid epoxy materials, for example, castings, polystyrene, vinyl polymers and copolymers, polyesters, polyamides, acrylonitrile-benzene-styrene polymers, polyethylene, and the like. For further particulars on substrates which may be employed, reference may be had to U.S. Pat. Nos. 3,451,838, 3,647,510, 3,650,808 and 3,707,397, all of which are hereby incorporated by reference. In order to increase the tenacious adherence of the coating to the substrates, conventional priming techniques may be employed including not only the application of aminoalkylsilanes or thermosettable acrylics but also flame treating, acid etching, and the like. It is usually preferred that primers be employed. The latter two patents cited immediately above disclose especially suitable primers which are quite acceptable for purposes of the present invention.

Thus, in accordance with one aspect of this invention, there is provided a method for making a coating composition which is rapidly convertible to a hard, strongly adhered, abrasion-resistant, mar-resistant, chemical resistant, and acetone-resistant coating which comprises heating methyltrialkoxysilane, wherein the alkoxy group contains between about one to six carbon atoms, with between about 1.5 to about 10, preferably 1.5 to about 5, and, most desirably, about 2 to 3 moles of water per mole of total silane in the presence of an effective catalyzing amount of a hydrolysis catalyst, for example, a mineral acid like HCl, between about 40°C. up to and including the reflux temperature, for a period of about 1 to 10 hours, so as to produce a substantially gel-free solution, which contains a dissolved, hydrolyzed and partially condensed organopolysiloxane, and then concentrating the solution containing said dissolved, hydrolyzed and partially condensed organopolysiloxane by heating to remove some, but not all, volatile material, including alkanol by-products and some water, so as to further condense the organopolysiloxane and obtain a solution of a hydrolyzed and (further) partially condensed organopolysiloxane and then adding to the solution a methylated and alkylated melamine-formaldehyde partial condensate, reaction product resin so as to form a solution.

According to another aspect of this invention, the coating composition is made by a process wherein the methyltrialkoxysilane is heated with between about 1.5 to about 10 moles of water preferably 1.5 to 5, and, most desirably, 2 to 3 moles of water per mole of total silane in the presence of an effective catalyzing amount of a hydrolysis catalyst between about 40°C. up to and including the reflux temperature for a period of about 1 to 10 hours, so as to produce a substantially gel-free solution which contains a dissolved, hydrolyzed and partially condensed organopolysiloxane and then concentrating the solution, which further condenses the hydrolyzed and partially condensed organopolysiloxane, by heating to remove some, but not all, volatile material including alkanol by-products and some water so as to obtain a solution of a hydrolyzed and (further) partially condensed organopolysiloxane; the latter material is precured by heating below the gel point thereof to provide a solvent-soluble, further-curable organopolysiloxane by removal of volatiles and then there is added to the resulting solvent-soluble, further-curable organopolysiloxane a (methanol and alkyl alcohol) melamine-formaldehyde partial condensate reaction product resin. As indicated hereinbefore, after the precuring step the solvent-soluble, further-curable organopolysiloxane may be solidified by spray-drying or by cooling, such as, for example, with a flaker, to produce a solid, particulate or flaked product, which product may then be dissolved in an organic solvent to which there is then added the methylated and alkylated melamine-formaldehyde material so as to form a solution of the coating composition. Similarly, the precured material, prior to solidification, may be dissolved in an organic solvent and the melamine-formaldehyde partial condensate added so as to form the coating composition solution.

The amount of the acid hydrolysis catalyst, for example HCl, may vary over a certain range and in general is dependent upon the molar ratio of water to silane. In general, it may be stated that several parts per million by weight, for example one or two or three, up to about 130, or even as much as 700, parts per million by weight based on total weight of water and silane will be usually suitable.

In a particularly highly preferred embodiment of this invention, the organopolysiloxane will be prepared from methyltriethoxysilane. When using methyltriethoxysilane, it will generally be convenient to effect the first heating step at a temperature of about 50°C. to about 90°C. and then to do the concentrating step by heating at temperatures generally in the range of about 65°C. to about 300°C., preferably about 70°C. to 90°C.

The desired concentration of the heating step to remove some of the volatiles but not all, including alkanol by-product and some water, may conveniently be done to form a solution containing about 20 to about 75 percent by weight of organopolysiloxane resin solids. Preferably the concentration will be effected for a sufficient period of time to produce a solution having an organopolysiloxane resin solid concentration of about 35 or 40 to about 55 or 60 percent solids by weight and most desirably about 45–55. The concentration step effected by the removal of some, but not all, volatile materials can be taken to the point where the ultimate desired concentration of organopolysiloxane in the coating composition is produced or other concentrations may be produced with the solution then being appropriately diluted as required for the particular coating application.

In a particularly highly preferred embodiment of this invention, the organopolysiloxane is produced by a method which consists essentially of heating the silanes as described above, methyltriethoxysilane being most preferred, followed by the concentrating step, to remove some but not all volatile materials so as to obtain a solution of a hydrolyzed and further partially condensed organopolysiloxane and then the melamine-formaldehyde resin is added thereto. That is, in a highly preferred embodiment, the precuring step is not employed and the material is employed prior to the precuring step as a coating composition. Thus, as used in the claims, as applied to the process for manufacturing the specific organopolysiloxanes, the terminology "consisting essentially of" contemplates the elimination of the precuring step in the synthesis and using the material as it exists prior to that step in an organic solvent solution along with the alkyl alcohol-melamine-formaldehyde partial condensate reaction product resin.

For further details with respect to the manufacture of the organopolysiloxanes, reference may be had to U.S. Pat. No. 3,389,114, and with regard to the manufacture of a precured product, reference may be had to U.S. Pat. No. 3,634,321, and with reference to the manufacture of a solid solvent-soluble, further-curable organopolysiloxane, reference may be had to U.S. Pat. Nos. 3,414,540 and 3,383,773, all of which are hereby incorporated by reference. Additionally, reference may be had to U.S. Pat. Nos. 3,457,323, 3,415,778 and 3,457,221 which disclose additives for these organopolysiloxanes, none of which, however, suggest the present invention.

In the coating aspect of this invention, all that is required is that there is applied onto the polymeric substrate an organic solvent solution of a coating composition prepared as described above, followed by evaporating the solvent and then heating the residual composition on the substrate at a temperature and for a time sufficient to thermoset the residual coating composition and form a hard, mar-resistant, abrasion-resistant, chemically resistant, acetone-resistant, strongly adhered coating on the substrate. Thus, considering the process wherein the organopolysiloxane is prepared by the initial heating step and then the concentrating step, this material may, depending on the degree of concentration selected, be diluted with a suitable organic solvent and the methylated and alkylated-melamine-formaldehyde partial condensate material added either prior to or subsequent to the dilution, and then that solution simply applied onto a substrate and treated as indicated. If the organopolysiloxane is prepared by the process which includes forming the precured material, this precured material will generally then be dissolved in a suitable organic solvent to an appropriately selected concentration, the melamine-formaldehyde material added thereto and then this solution employed, as indicated above. Similarly, if the precured product is formed into a solid, i.e., flake or particulate mass, the solid will be simply dissolved in an organic solvent with the appropriate addition of the melamine-formaldehyde material and then that solution employed. The coating composition may be applied by any conventional technique including, for example, spraying, brushing, dipping or flow coating.

The final curing step, that is, after the organic solvent of the solution has been evaporated, will be effected at temperatures and times routinely selected by those skilled in the art.

It will, of course, be apparent that the heating cycles will be governed somewhat by the characteristics and qualities of the substrate employed and they will not be so selected as to cause significant deterioration in the overall qualities of the substrate. In general, it may be stated, however, that high quality coatings of the type indicated above are conveniently formed by heating at temperatures ranging from between about 80°C. to 135°C. and for times generally ranging from about ½ to 24 hours. Other time-temperature heating cycles may, of course, be employed.

The materials which have been found to be effective in promoting the curing rate of the organopolysiloxanes described above so as to provide what is considered to be a meaningful increase in the curing rate and thereby enhancing the rate at which the ultimate desired properties are obtained may be described as (methylated and lower-alkylated)-melamine-formaldehyde partial condensate reaction product resins. These materials are soluble in lower alkyl alcohols and are not per se new and are widely available from various commercial suppliers. As is well known, these materials are partial condensate resin products obtained from the reaction of melamine with formaldehyde and then alkylation with appropriate alcohols. The materials which are effective herein are prepared by using methanol and a $C_2 - C_4$ alcohol, preferably isobutanol, in a molar ratio of methanol to isopropanol of at least 1:1, preferably about 1:1 or 2:1 to about 26:1, and most desirably about 2:1 to 2.5:1. Thus, it may be stated that the molar ratio of methyl groups to $C_2 - C_4$ groups is at least 1:1, preferably in the range of 1:1 to 26:1, and most desirably, in the range of about 2:1 to 2.5:1.

Excellent results are obtained, for example, by using a (methylated and isobutylated)-melamine-formaldehyde partial condensate resin wherein the ratio of methyl groups to isobutyl groups is about 2:1 to 2.5:1. Another suitable material will have a molar ratio of methyl to isobutanol of about 24:1. Additionally, the resins will advantageously have a water tolerance in terms of pounds of water per 100 pounds of a standard solution of at least 300, and a 'hydrocarbon' tolerance, also in pounds per hundred pounds of a standard solution, of between about 20-200 and preferably 35-130. The water tolerance and 'hydrocarbon' tolerance, as expressed above, is based upon a standard solution containing about 66 to 67 percent of the (methylated and $C_2 - C_4$ alkylated)-melamine-formaldehyde partial condensate resin in a solution of a mixture of isobutanol and isopropanol wherein the isopropanol and isobutanol are present in a weight ratio of about 1:1. The tolerance tests are conventional tests with these resins. The 'hydrocarbon' employed is a mixture of about 76.4 weight percent n-heptane and 23.6 percent by weight toluene. An especially suitable material is a methylated and isobutylated-melamine-formaldehyde having a water tolerance of about 340–400 pounds and a 'hydrocarbon' tolerance of about 100–140 pounds based on 100 pounds of the above 66–67% standard solution. One such material is available from Koppers Company, Inc. as their B-500-15 resin. It is actually supplied as about an 80 weight percent solution in isobutanol. Its color by Gardner (Delta) Max is about 1. It has a viscosity at 25°C. of $Z_2 - Z_5$, a density of about 9.4 lbs. per gallon, and has a xylene tolerance of about 275 lbs. per 100 lbs. of the 80 percent solution.

Another suitable methylated and isobutylated melamine-formaldehyde partial condensate resin has a molar ratio of methyl to isobutyl of about 24:1. The hydrocarbon tolerance in the standard solution as described above is between about 35 to 52 and the water tolerance is greater than 3500. The material is available from Rohm & Haas and is supplied in an 80 percent by weight solution in a solvent of one weight part isobutanol to one weight part isopropanol. The material as supplied under the designation MM-83 has a xylene tolerance of 40 pounds per 100 pounds of the 80% solution.

In passing, it should be mentioned that while the methylated and lower alkylated melamine-formaldehyde partial condensation products taught herein may be generally considered to be amino-plast resins, all amino-plasts do not appear to be the full equivalents of the materials contemplated herein. Isobutylated urea formaldehyde resins, butylated melamine-formaldehyde, and isobutylated melamine-formaldehyde resins, and CYMEL-301 hexamethoxymethylmelamine(which is really not a partial condensate resin, but is monomeric, or, perhaps, slightly dimeric) are not the full equivalents of the (methylated and lower alkylated)-melamine-formaldehyde partial condensate resins contemplated for use herein.

The amount of the (methylated and lower alkylated)-melamine-formaldehyde partial condensate resins added to the organopolysiloxanes will be routinely selected by those skilled in the art. Preferably, however, the amount will be about 3 to about 15 percent by weight of the former based on organopolysiloxane resin solids. Above about 15% the coatings tend to be brittle. Most desirably, the amount will be about 5 or 6 to about 8 or 10 percent.

While the above has described the invention with sufficient particularity to enable those skilled in the art to make and use the same, the following will further exemplify in a more detailed fashion the present invention. In the following examples, commercially available pure methyltriethoxysilane was employed. This methyltriethoxysilane has an HCl content of about 0 or 1 parts per million by weight and has a purity as measured by gas chromatography in excess of 99 percent and additionally, shows an ultraviolet transmission at 320 millimicrons of in excess of 95 percent and in excess of 50 percent at 267 millimicrons using distilled water as a blank.

EXAMPLE 1

A solution of a hydrolyzed and partially condensed, further-condensable organopolysiloxane was prepared by hydrolyzing and condensing about 267.5 pounds of methyltriethoxysilane with about 67.5 pounds of distilled water having a resistivity of in excess of about 0.8 megohm-cm in a reactor equipped with a reflux condenser using about two to three weight parts of HCl per million parts of water and silane. The reaction mixture was heated with agitation to a temperature of about 50°–52° C., at which point a reaction ensued, as exhibited by an exotherm, and the reaction mass allowed to reach the refluxing temperature. After the exotherm had subsided, as indicated by decreased rate of refluxing, the mixture was heated at the reflux temperature for about 4 hours. Initially, a two-phase reaction mixture was formed which clarified to a one-phase system due to the ethanol liberated in the reaction acting as a solvent. After heating at reflux for about 4 hours, the solution of the hydrolyzed and partially condensed organopolysiloxane was further heated to remove some but not all volatiles, including ethanol by-product and some water, so as to produce a substantially gel-free solution containing about 45 to 50 percent by weight of a hydrolyzed and partially condensed, further-condensable, thermosettable organopolysiloxane.

The solution, as produced above, is then filtered through a one micron pore size filter to remove any solid particles which might have been formed and the filtered material was then diluted with normal butanol to a concentration of about 30 percent by weight organopolysiloxane solids. To this solution there was then added an 80 percent solution in isobutanol of a methylated and isobutylated melamine-formaldehyde partial condensate reaction product resin to form a coating solution. The amount of the latter solution which was added produced a coating composition in which the methylated and isobutylated melamine-formaldehyde partial condensate resin was present in an amount of about 8 percent by weight of the organopolysiloxane resin solids, the ratio of methyl to isobutyl being about 2:1 to 2.5:1. The material employed had a color, Gardner (Delta) Max of about one, a viscosity of the 80 percent solution at 25° C., of $Z_2$–$Z_5$, and a xylene tolerance of about 275 pounds of xylene per 100 pounds of the 80 percent solution. Additionally, this resin in a solution of about 66 to 67 percent by weight in a 1:1 weight ratio of isopropanol and isobutanol had a water tolerance of about 355 to about 383 pounds of water per 100 pounds of the 66 to 67 percent solution and a hydrocarbon tolerance of about 120 to 122 pounds of hydrocarbon per 100 pounds of the 66–67 percent solution wherein the hydrocarbon is a mixture of 76.4 percent by weight of normal heptane and 23.6 percent by weight of toluene. Exemplary of this type material is the well known commercially available material B-500-15, which is supplied by Koppers Company, Inc.

A solid, substantially non-porous polycarbonate, for example, "LEXAN" material, was primed by treating it with a 1 percent solution of gamma-aminopropyl triethoxysilane in normal butanol, which primed polycarbonate after application of the priming solution, was dried for about 5 minutes at about 200° F. The primed, solid polycarbonate was then dipped into the coating solution as provided above and the solvent from the coating solution was allowed to evaporate and then the residual coating composition cured by heating at a time and for a temperature sufficient to obtain a thermoset, strongly adhered, hard, acetone-resistant coating on the material. It will, of course, be appreciated that various time-temperature relationships may be employed to produce the desired coating. Excellent coatings will typically be produced using a temperature of about 120° C. to about 135° C. for a period of time of from about one-half hour or 1 hour to about 2 hours.

The adherence of the film can be measured by numerous conventional techniques. Adherence, for example, may be determined by simply cross-hatching the coating with a sharp object and placing a piece of tape (3M-No. 670) over the hatched marks. The tape is then pulled away from the coating and visually examined for any coating which is removed; substantially, no removal is excellent. Acetone resistance can be measured by placing an acetone saturated cloth, to which is periodically added additional acetone to maintain the saturated state, over the coating and determining the time required for the acetone to penetrate the coating. The hardness of the coating is measured by pencil hardnesses and is a conventional technique in the art. While the technique of pencil hardness measurement may be subjective from individual to individual, it is generally a reliable test when the testing is done by a single individual.

EXAMPLE 2

The procedure of Example 1 was generally followed except that the organopolysiloxane solution after the removal of the volatiles to produce the 45–50 percent solution was further treated in the following manner. The reactor was sealed and the solution of the hydrolyzed and partially condensed organopolysiloxane was heated to build up a pressure of about 20 psig in the reactor and held at this temperature for about 15 to 18 hours. This material, after cooling to about room temperature, was filtered through a one-micron filter, to remove any solids which might have formed and this material was then precured to produce a solvent-soluble, further-curable organopolysiloxane and the latter material was then cooled on a drum flaker and converted into flakes. The precuring was effected in a wiped film evaporator of the type disclosed in U.S. Pat. Nos. 3,414,540 and 3,634,321 with the mean residence time in the wiped film evaporator being about 20–30 seconds and the wiped film evaporator being operated at a wall temperature of about 200° C.

A 30 percent by weight solution of the flaked, solventsoluble, further-curable organopolysiloxane was then prepared in isobutanol and to this solution there was then added an 80 percent by weight solution in isobutanol of a methylated and isobutylated melamine-formaldehyde, partial condensate reaction product, wherein the ratio of the methyl groups to isobutyl groups on a mole basis was about 2:1 to about 2.5:1. The specific material employed was the same as that employed in Example 1 above, with the 80 percent solution being added in an amount sufficient to form a solution containing about 8 percent by weight of the methylated and isobutylated resin based upon the weight of the organopolysiloxane resin.

The coating composition as produced in the manner described immediately above was then applied as in Example 1 onto a polycarbonate substrate which had been primed as in Example 1. The solvent from the solution was evaporated, and the residual coating composition then heated at a temperature of about 135°C. for 1 hour to thermoset the composition and form an adherent film with improved hardness and acetone resistance relative to a coating produced without the use of the methylated and isobutylated melamine-formaldehyde partial condensate reaction product resin.

In general, testing indicates that the coated product produced in accordance with the procedure of Example 1, that is, by using the nonprecured organopolysiloxane, is preferred relative to the procedure of Example 2, wherein a flaked material was used. The former appears to be more reproducible.

We claim:

1. A method for providing a solid organic polymeric surface with a hard, strongly adhered, abrasionresistant, mar-resistant, chemically resistant, acetone-resistant, coating wherein a thermosettable resin system is cured in a short time, said method comprising the steps of:
  1. applying onto said polymeric substrate an organic solvent solution of a coating composition prepared by a method which comprises:
    a. heating methyltrialkoxysilane, wherein the alkoxy group contains between one and six carbon atoms, with between about 1.5 moles to about 10 moles of water per mole of total silane in the presence of an effective catalyzing amount of a acid hydrolysis catalyst between about 40°C. up to and including the reflux temperature for a period of about 1–10 hours so as to produce a substantially gel-free solution which contains a dissolved, hydrolyzed and partially condensed organopolysiloxane,
    b. concentrating the solution containing said dissolved, hydrolyzed and partially condensed organopolysiloxane by heating to remove some but not all volatile material, including alkanol by-product and some water, so as to obtain a solution of a hydrolyzed and further partially condensed organopolysiloxane,
    c. precuring the resultant product by heating below the gel point thereof to remove volatiles and produce a solvent-soluble, further-curable organopolysiloxane, and
    d. adding in an amount, of between about 3% to about 15% by weight based on organopolysiloxane solids, an alkylated melamine-formaldehyde partial condensate resin to said solvent-soluble, further-curable organopolysiloxane, said alkylated resin being a methylated and $C_2$–$C_4$ alkylated resin wherein the molar ratio of methylation to $C_2$–$C_4$ alkylation is at least 1:1 and wherein said resin, based on a 66–67 weight percent solution in a 1:1 weight mixture of isobutanol to isopropanol has a hydrocarbon tolerance of about 20–200 and a water tolerance of about at least 300, and
  2. evaporating said solvent, and heating said substrate at a temperature and for a time sufficient to thermoset the residual coating composition and form a hard, mar-resistant, abrasion-resistant, chemically resistant, acetone-resistant, strongly adhered coating consisting essentially of the heat cured product of an organopolysiloxane and a methylated and lower alkylated melamine-formaldehyde resin, on said substrate.

2. The method of claim 1 wherein said substrate is an acrylic substrate and wherein said silane is methyltriethoxysilane.

3. The method of claim 2 wherein the amount of water employed is between about 2 to about 3 moles of water per mole of silane and wherein said catalyst is HCl.

4. The method of claim 1 wherein said substrate is a polycarbonate.

5. The method of claim 4 wherein the amount of water employed is between about 2 to about 3 moles of water per mole of silane, said catalyst is HCl and wherein said silane is methyltriethoxysilane.

6. The method of claim 5 wherein step (1c) further includes the steps of solidifying said solvent-soluble, further-curable organopolysiloxane and then dissolving said solvent-soluble, further-curable organopolysiloxane in an organic solvent.

7. The method of claim 6 wherein the concentrating of step (1b) is done for a sufficient period of time to produce a solution having about 45–55 percent solids by weight and wherein said alkylated resin is methylated and isopropylated in a mole ratio of about 2:1 – 2.5:1.

8. A method of forming a hard, abrasion-resistant, strongly adhered, mar-resistant, chemically resistant, acetone-resistant coating on solid organic polymeric substrates which comprises:
  1. applying onto said polymeric substrate an organic solvent solution of a coating composition prepared by a process which comprises:
    a. heating methyltrialkoxysilane, wherein the alkoxy group contains between 1 and 6 carbon atoms, with between about 1.5 and 10 moles of water per mole of total silane in the presence of an effective catalyzing amount of a acid hydrolysis catalyst between about 40°C. up to and including the reflux temperature for a period of about 1–10 hours so as to produce a substantially gel-free solution which contains a dissolved, hydrolyzed and partially condensed organopolysiloxane,
    b. concentrating the solution containing said dissolved, hydrolyzed and partially condensed organopolysiloxane by heating to remove some but not all volatile material, including alkanol by-product and some water, so as to obtain a solution of a hydrolyzed and further partially condensed organopolysiloxane,
    c. adding an alkylated, melamine-formaldehyde partial condensate resin to said solution of step (b), in an amount of between about 3% to about 15% by weight based on organopoly-siloxane solids, said alkylated resin being a methylated and $C_2$ – $C_4$ alkylated resin wherein the molar ratio of methylation to $C_2$ – $C_4$ alkylation is at least 1:1 and wherein said resin, based on a 66–67 weight percent solution in a 1:1 weight mixture of isobutanol to isopropanol has a hydrocarbon tolerance of about 20–200 and a water tolerance of about at least 300, and
  2. evaporating said solvent, and heating said substrate at a temperature and for a time sufficient to thermoset the residual coating composition and form a hard, mar-resistant, abrasion resistant, chemically resistant, acetone-resistant, strongly adhered coating consisting essentially of the heat cured product of an organopolysiloxane and a methylated and lower alkylated melamine-formaldehyde resin.

9. The method of claim 8 wherein said polymeric substrate is an acrylic.

10. The method of claim 9 wherein said silane is methyltriethoxysilane, said catalyst is HCl, and wherein the amount of water is between about 2 to about 3 moles of water per mole of total silane.

11. The method of claim 8 wherein said polymeric substrate is a polycarbonate.

12. The method of claim 11 wherein said silane is methyltriethoxysilane, said catalyst is HCl, and the amount of water is between about 2 to about 3 moles of water per mole of total silane.

13. The method of claim 12 wherein said alkylated, melamine formaldehyde resin is alkylated with methanol and isobutanol in a mole ratio of about 2:1 to about 2.5:1 and wherein an 80% solution of said resin in isobutanol has a xylene tolerance of about 275.

14. A method for forming hard, abrasionresistant, strongly adhered, mar-resistant, acetone-resistant, chemically resistant coatings on a solid polycarbonate substrate which comprises:
1. adding in an amount of between about 3% to about 15% by weight based on organopolysiloxane solids a methylated and isobutylated melamine-formaldehyde partial condensate resin to an organic solvent solution of a hydrolyzed and partially condensed thermosettable organopolysiloxane so as to form a solution of a coating composition, said organopolysiloxane being prepared by the process consisting essentially of
   a. heating methyltriethoxysilane with about 1.5 to about 5 moles of water per mole of silane in the presence of an effective catalyzing amount of HCl between about 50°C. to about 90°C. for a period of about 1–10 hours so as to produce a substantially gel-free solution which contains a dissolved, hydrolyzed and partially condensed organopolysiloxane therein and then,
   b. concentrating the solution containing said hydrolyzed and partially condensed organopolysiloxane by heating to remove some but not all volatile material, including alkanol by-product and some water, so as to obtain a solution of said organopolysiloxane, said methylation and isobutylation being in a ratio of about 2:1 – 2.5:1 and an 80% by weight solution of said resin in isobutanol having a xylene tolerance of about 275 and a viscosity at 25°C. of $Z_2 - Z_5$,
2. applying said solution of said coating composition onto a solid polycarbonate substrate, and
3. evaporating said solvent and heating said substrate for a time sufficient and at a temperature sufficient to thermoset the residual coating composition and form a hard, abrasionresistant, strongly adhered, mar-resistant, chemically resistant, acetone-resistant coating consisting essentially of the heat cured product of an organopolysiloxane and a methylated and lower alkylated melamine-formaldehyde resin, on said substrate.

15. A method for providing a solid polycarbonate substrate with a hard, strongly adhered, abrasion-resistant, mar-resistant, chemical-resistant, and acetone-resistant coating which comprises:
1. heating methyltrialkoxysilane, wherein the alkoxy group contains between one and six carbon atoms, with between about 1.5 to about 10 moles of water per mole of total silane, in the presence of an effective catalyzing amount of a acid hydrolysis catalyst, between about 40°C. up to and including the reflux temperature for a period of about 1–10 hours so as to produce a substantially gel-free solution which contains a dissolved, hydrolyzed and partially condensed organopolysiloxane,
2. concentrating the solution containing said dissolved, hydrolyzed and partially condensed organopolysiloxane by heating to remove some but not all volatile material, including alkanol by-product and some water, so as to obtain a solution of a hydrolyzed and further partially condensed organopolysiloxane,
3. adding to said solution containing said hydrolyzed and further partially condensed organopolysiloxane, in an amount of between about 3% to 15% by weight based on organopolysiloxane solids, an alkylated melamine formaldehyde partial condensate resin which is soluble in said solution, wherein alkylation is effected with methanol and a $C_2 - C_4$ alkanol in a mole ratio of methanol to said alkanol of at least about 1:1,
4. applying a solution of the product of step (3) onto a polycarbonate substrate, evaporating free volatiles therefrom, and heating said substrate at a temperature and for a time sufficient to thermoset the residual coating composition and form a hard, abrasion-resistant, mar-resistant, chemically resistant, acetone-resistant, strongly adhered coating consisting essentially of the heat cured product of an organopolysiloxane and a methylated and lower alkylated melamine-formaldehyde resin, on said substrate.

16. A method for providing a solid organic polymeric surface with a hard, strongly adhered, abrasion-resistant, mar-resistant, chemically resistant, acetone-resistant coating wherein a thermosettable resin system is cured in a short time, said method comprising the steps of:
1. applying onto said polymeric substrate an organic solvent solution of a coating composition prepared by a method which comprises:
   a. heating methyltrialkoxysilane, wherein the alkoxy group contains between 1–6 carbon atoms, with between about 1.5 moles to about 10 moles of water per mole of total silane, in the presence of an effective catalyzing amount of a acid hydrolysis catalyst, between about 40°C. up to and including the reflux temperature for a period of about 1 to 10 hours so as to produce a substantially gel-free solution which contains a dissolved, hydrolyzed and partially condensed organopolysiloxane,
   b. concentrating the solution containing said dissolved, hydrolyzed and partially condensed organopolysiloxane by heating to remove some but not all volatile material, including alkanol by-product and some water, so as to obtain a solution of a hydrolyzed and further partially condensed organopolysiloxane,
   c. precuring the resultant product by heating below the gel point thereof to provide a solvent-soluble, further-curable organopolysiloxane, d. adding to said siloxane, in an amount of between about 3 to about 15% by weight based on organopolysiloxane solids, an alkylated melamine formaldehyde partial condensate resin wherein alkylation is effected with methanol and a $C_2$–$C_4$ alkanol in a mole ratio of methanol to said alkanol of at least about 1:1, 2. evaporating said solvent, and heating said substrate at a temperature and for a time sufficient to thermoset the residual coating composition and form a hard, marresistant, abrasion-resistant, chemically resistant, acetoneresistant, strongly adhered coating consisting essentially of the heat cured product of an organopolysiloxane and a methylated and lower alkylated melamine-formaldehyde resin, on said substrate.

17. A method of forming a hard, abrasion-resistant, strongly adhered, mar-resistant, chemically resistant, acetone-resistant coating on solid organic polymeric substrates which comprises:

1. applying onto said polymeric substrate an organic solvent solution of a coating composition prepared by a process which comprises:

a. heating methyltrialkoxysilane, wherein the alkoxy group contains between one to six carbon atoms, with between about 1.5 to about 10 moles of water per mole of total silane, in the presence of an effective catalyzing amount of a acid hydrolysis catalyst, between about 40°C. up to and including the reflux temperature for a period of about 1–10 hours so as to produce a substantially gel-free solution which contains a dissolved, hydrolyzed and partially condensed organopolysiloxane, b. concentrating the solution containing said dissolved, hydrolyzed and partially condensed organopolysiloxane by heating to remove some but not all volatile material, including alkanol by-product and some water, so as to obtain a solution of a hydrolyzed and further partially condensed organopolysiloxane, c. adding to said solution containing said hydrolyzed and further partially condensed organopolysiloxane, in an amount of between about 3 to about 15% by weight based on organopolysiloxane solids, an alkylated melamine formaldehyde partial condensate resin which is soluble in said solution wherein alkylation is effected with methanol and a $C_2$–$C_4$ alkanol in a mole ratio of methanol to said alkanol of at least about 1:1, 2. evaporating said solvent, and heating said substrate at a temperature and for a time sufficient to thermoset the residual coating composition and form a hard, mar-resistant, abrasion resistant, chemically resistant, acetone-resistant, strongly adhered coating consisting essentially of the heat cured product of an organopolysiloxane and a methylated and lower alkylated melamine-formaldehyde resin.

* * * * *